US012172128B2

(12) United States Patent
Zou

(10) Patent No.: US 12,172,128 B2
(45) Date of Patent: Dec. 24, 2024

(54) PRESSURE WASHER

(71) Applicant: Qingdao Ecopure Filter Co., Ltd., Qingdao (CN)

(72) Inventor: Zhibin Zou, Qingdao (CN)

(73) Assignee: Qingdao Ecopure Filter Co., Ltd., Qingdao (CN)

( * ) Notice: Subject to any disclaimer, the term of this patent is extended or adjusted under 35 U.S.C. 154(b) by 295 days.

(21) Appl. No.: 17/899,257

(22) Filed: Aug. 30, 2022

(65) Prior Publication Data

US 2023/0076968 A1 Mar. 9, 2023

(30) Foreign Application Priority Data

Aug. 30, 2021 (CN) .......................... 202111004610.5
Aug. 30, 2021 (CN) .......................... 202122062570.1

(51) Int. Cl.
   *B60S 3/04*       (2006.01)
   *B01D 61/02*      (2006.01)
   *C02F 1/44*       (2023.01)

(52) U.S. Cl.
   CPC .............. *B01D 61/025* (2013.01); *B60S 3/04* (2013.01); *C02F 1/441* (2013.01)

(58) Field of Classification Search
   None
   See application file for complete search history.

(56) References Cited

U.S. PATENT DOCUMENTS

| 5,160,430 A * | 11/1992 | Gasser .................. B01D 61/12 210/167.01 |
| 5,413,128 A * | 5/1995 | Butts ........................ B60S 3/04 134/123 |
| 2003/0230522 A1* | 12/2003 | Pavel ..................... B01D 61/08 210/259 |

FOREIGN PATENT DOCUMENTS

WO    WO-9321045 A1 * 10/1993   ............... B60S 3/04

\* cited by examiner

*Primary Examiner* — Cristi J Tate-Sims
(74) *Attorney, Agent, or Firm* — Calfee, Halter & Griswold LLP

(57) ABSTRACT

A car washing system comprises a filtering unit, a pure water pipeline, a waste water pipeline, a washing pipeline, an optional first branch line, and a second branch line. The filtering unit comprises an RO filter membrane, a filtering pipeline and a booster pump. One end of the filtering pipeline is connected to the inlet of the RO filter membrane. The booster pump is set in the filtering pipeline. The pure water pipeline is connected between a pure water outlet of the RO filter membrane and one end of the washing pipeline. The joint of the pure water pipeline and the washing pipeline is provided with a high-pressure pump. One end of the waste water pipeline is connected with waste water outlet of the RO filtering membrane, and the other end is a discharge end. The second branch line is connected between the waste water pipeline and the washing pipeline.

15 Claims, 2 Drawing Sheets

PRESSURE WASHER

CROSS REFERENCE TO RELATED APPLICATIONS

This application claims priority to and any other benefit of Chinese Invention Patent Application No. 202111004610.5, filed Aug. 30, 2021, and Chinese Utility Model Patent Application No. 202122062570.1, filed Aug. 30, 2021, the entire contents of which are incorporated by reference herein.

FIELD

The present invention relates to the technical field of car washing device and technology, particularly to a car washing system.

BACKGROUND

In order to achieve the effect of eliminating the need of wiping the car body after the car washing, the solution in the existing car washing device is to wash the car preliminarily with raw water, and then wash with pure water. During the car washing, the raw water is not pressurized and a water pressure of the tap water is applied, which leads to poor washing effect. During the switching to pure water, in order to ensure the water quality, RO membrane needs to be rinsed before preparing pure water, resulting in the wait for pure water usage, which affects the user experience. After the car washing, water remains in the water pipe. Long-term residual water damages the car washing device, and interferes with storage.

SUMMARY

A major purpose of the present invention is to overcome at least one defect of the prior art and provide a car washing system with better flushing effect and free from waiting for water when needed.

In order to achieve the above purpose, the application applies the following technical scheme:

According to a first aspect of the present invention, a car washing system is provided, where: said car washing system comprises a filtering unit, a pure water pipeline, a waste water pipeline, a washing pipeline, an optional first branch line, and a second branch line; said filtering unit comprises an RO filter membrane, a filtering pipeline and a booster pump; one end of said filtering pipeline is connected to the inlet of the RO filter membrane, and said booster pump is set in the filtering pipeline; said pure water pipeline is connected between a pure water outlet of the RO filter membrane and one end of the washing pipeline, and the joint of the pure water pipeline and the washing pipeline is provided with a high-pressure pump; one end of said waste water pipeline is connected with waste water outlet of the RO filtering membrane, and the other end thereof is a discharge end; said first branch line (if provided) and the second branch line are connected in parallel connection between the waste water pipeline and the washing pipeline, respectively.

According to one embodiment of the invention, said washing system further comprises a filter cartridge, and the other end of the filtering pipeline is connected to an outlet of the filter cartridge.

According to one embodiment of the invention, the filter cartridge is a PPCTO composite filter cartridge.

According to one embodiment of the invention, a low-pressure inlet of the booster pump leads to an outlet of the filter cartridge, and a high-pressure outlet of the booster pump leads to an inlet of the RO filter membrane.

According to one embodiment of the invention, an inlet of the high-pressure pump leads to the pure water pipeline, and an outlet of the high-pressure pump leads to the washing pipeline.

According to one embodiment of the invention, the pure water pipeline is provided with a first control valve, and a section of the waste water pipeline between the first branch line and second branch line is provided with a second control valve. The first branch line is provided with a first one-way valve, and conducting direction of the first one-way valve is a direction from the waste water pipeline to the washing pipeline; the second branch line is provided with a third control valve, and the filtering pipeline is provided with a fourth control valve.

According to one embodiment of the invention, the third control valve is a solenoid valve, and working mode of the third control valve is normally closed with power and normally open without power.

According to one embodiment of the invention, the pure water pipeline is provided with a second one-way valve, and conducting direction of the second one-way valve is a direction from the RO filter membrane to the washing pipeline.

According to one embodiment of the invention, the connecting position of the waste water pipeline and the first branch line is closer to the RO filter membrane than the connecting position of the waste water pipeline and the second branch line; the section of the waste water pipeline between the first branch line and the RO filter membrane is provided with an integrated waste water ratio and washing valve; the integrated waste water ratio and washing valve has two conducting positions, the relation of which is equivalent to parallel relation, which are waste water ratio position and electromagnetic valve position, respectively. When connected at the electromagnetic valve position, water flow of the integrated waste water ratio and washing valve is completely open; when connected at the waste water ratio position, water outlet of the integrated waste water ratio and washing valve is smaller than the water outlet when connected at the electromagnetic valve position.

According to one embodiment of the invention, a section of the washing pipeline between the high-pressure pump and the first branch line is provided with a first pressure switch for collecting the pressure information of the washing pipeline. The car washing system further comprises a control unit; the control unit is respectively connected to the booster pump, the high-pressure pump, the first control valve, the second control valve, the third control valve, the fourth control valve and the integrated waste water ratio and washing valve. The control unit is configured to control the booster pump, the high-pressure pump and the various valves according to the pressure information of the washing pipeline.

According to one embodiment of the invention, the car washing system further comprises raw water pipeline. One end of the raw water pipeline is connected to raw water inlet of the filter cartridge, and the other end is used to connect raw water source. The raw water pipeline is provided with a second pressure switch for collecting pressure information of the raw water pipeline. The control unit is configured to control the booster pump, the high-pressure pump and various valves according to the pressure information of the raw water pipeline.

According to one embodiment of the invention, the pure water pipeline is provided with a conductivity meter, and the conductivity meter is connected to a control unit. The conductivity meter is configured for collecting conductivity of pure water in the pure water pipeline and sending it to the control unit. The control unit is configured to issue an alarm when the conductivity is higher than a threshold value.

According to one embodiment of the invention, the other end of the washing pipeline is connected to a spray gun; and/or, the pure water pipeline is provided with a flowmeter; and/or, the car washing system further comprises a raw water pipeline, where one end of the raw water pipeline is connected to a raw water inlet of the filter cartridge, the other end thereof is used to connect a raw water source, and the raw water pipeline is provided with a conductivity meter.

According to the above technical scheme, the advantages and positive effects of the car washing system according to the present invention are as follows:

The car washing system according to the present invention uses a booster pump to pressurize the raw water to produce high pressure raw water, and the high-pressure raw water may be transported through the optional first branch line of the waste water pipeline to the washing pipeline for washing, which enables car washing by the pressurized raw water and improves the preliminary washing effect. At this time, the water inlet side of the RO filter membrane has a certain pressure, and the pure water outlet generates pure water, filling the pure water pipeline. The pure water side can directly discharge water when switching to pure water washing, where there is no waiting for water usage which improves user experience. In addition, after the car washing system completes the car washing, by opening the second branch line, high-pressure water in the washing pipeline and the pure water pipeline flows to the waste water pipeline through the second branch line, and discharges out of the device. Accordingly, the pressure in the system can by relieved after car washing is completed, and the water in each pipeline is discharged after the pressure relief, allowing easy storage. This solves the problem of residual water in the water pipes after car washing, where residual water in the long-term damages the car washing device.

BRIEF DESCRIPTION OF DRAWINGS

The various objectives, characteristics and advantages of the present invention will become more apparent by considering the following detailed descriptions of preferred embodiments of the present invention in conjunction with the accompanying drawings. The drawings are exemplary illustrations of the present invention only and are not necessarily drawn to scale. In the drawings, the same reference numbers always indicate the same or similar components. In the drawings.

Figure 1:
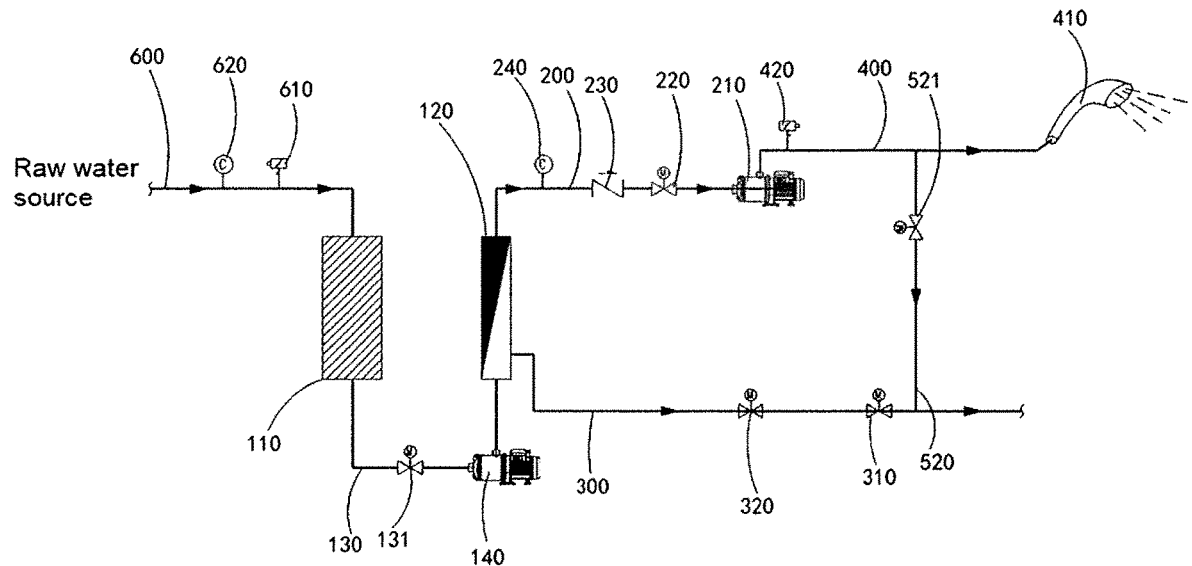
FIG. 1 is a system diagram of a car washing system shown according to an exemplary embodiment.

The reference numbers are described as follows:
110. Filter cartridge;
120. RO filter membrane;
130. Filtering pipeline;
131. Fourth control valve;
140. Booster pump;
200. Pure water pipeline;
210. High pressure pump;
220. First control valve;
230. Second check valve;
240. Conductivity meter;
300. Waste water pipeline;
310. Second control valve;
320. Integrated waste water ratio and washing valve;
400. Washing pipeline;
410. Spray gun;
420. First pressure switch;
510. First branch line;
511. First one-way valve;
520. Second branch line;
530. Third control valve;
600. Raw water pipeline;
610. Second pressure switch;
620. Conductivity meter.

DETAILED DESCRIPTION

Typical embodiments embodying the characteristics and advantages of the invention are described in detail in the following descriptions. It should be understood that the invention may have various variations in different embodiments, all of which are not out of the scope of the invention, and that the descriptions and drawings therein are intended to be illustrative in nature and not to limit the invention.

In the following descriptions of different exemplary embodiments of the invention, which are carried out with reference to the drawings, the drawings are incorporated as part of the invention. Exemplary structures, systems and steps are shown by way of example in various aspects the invention may be implemented. It should be understood that other specific arrangements of components, structures, exemplary devices, systems and steps may be utilized, and structural and functional modifications may be made without departing from the scope of the present invention. Furthermore, although the terms "on," "between," "within," etc. may be used in this specification to describe various exemplary features and components of the invention, these terms are used in this specification only for convenience, for example, according to the directions in the example described in the drawings. Nothing in this specification should be construed as requiring a particular three-dimensional orientation of the structure to fall within the scope of the present invention.

Figure 2:
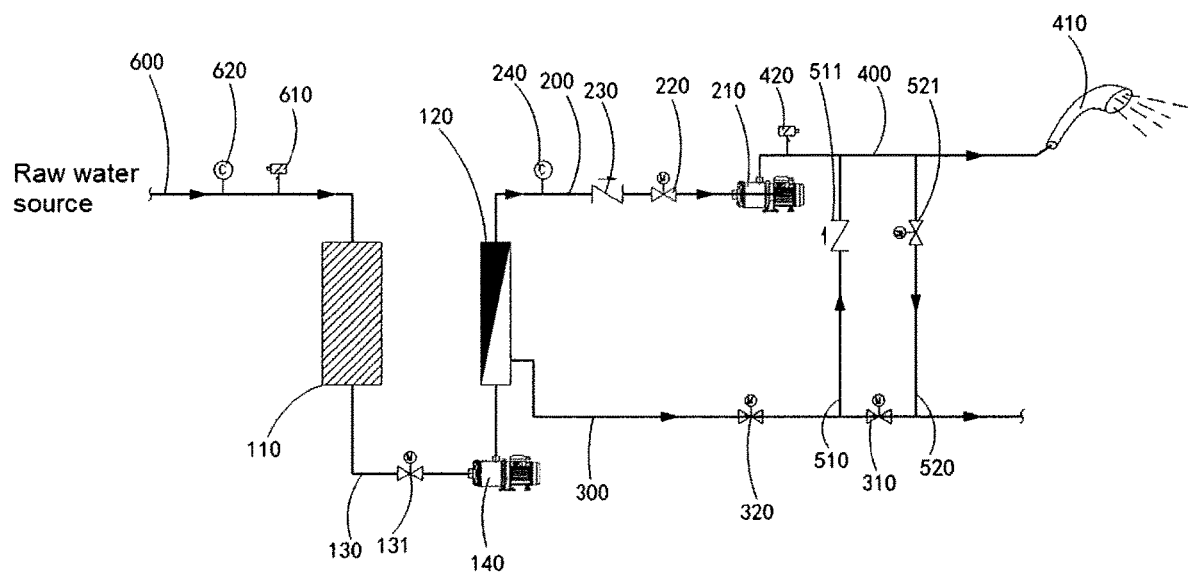
FIG. 2 is a system diagram of the car washing system of FIG. 1, further comprising the optional first branch line.
Figure 3:
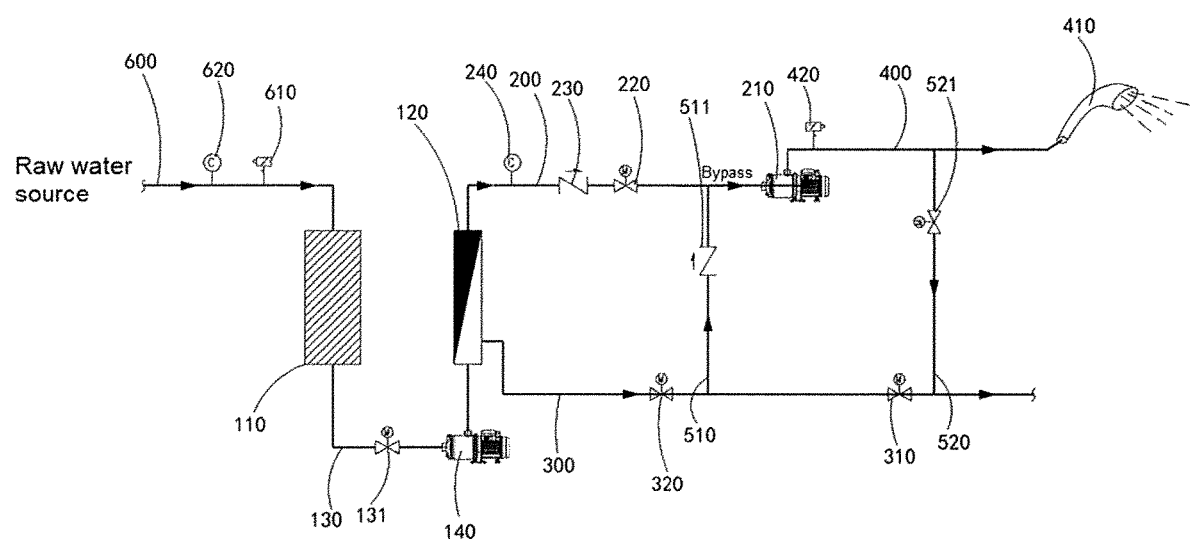
FIG. 3 is a system diagram of a car washing system shown according to another exemplary embodiment.

Referring to FIGS. 1-3, which show typical system diagrams of a car washing system according to the present invention. In the exemplary embodiment, the car washing system according to the present invention is described as being applied to cleaning a vehicle by way of example. It is easy for one skilled in the art to understand that, in order to apply the relevant design of the present invention to other washing devices, a variety of modifications, additions, substitutions, deletions or other changes can be made to the following specific embodiments, which are still within the scope of the principle of the car washing system according to the present invention.

As shown in FIGS. 1 and 2, in the present embodiment, the car washing system according to the present invention comprises a filtering unit, a pure water pipeline 200, a waste water pipeline 300, a washing pipeline 400, an optional first branch line 510, and a second branch line 520. Specifically, the filtering unit comprises a filter cartridge 110, an RO filter membrane 120, a filtering line 130 and a booster pump 140. The filter cartridge 110 has a raw water inlet and an outlet, and the RO filter membrane 120 has a water inlet, a pure water outlet and a wastewater outlet. The filtering pipeline 130 is connected between the water outlet of the filter cartridge 110 and the water inlet of the RO filter membrane 120. The booster pump 140 is set in the filtering pipeline 130. The pure water pipeline 200 is connected between the pure water outlet of the RO filter membrane 120 and one end of the washing pipeline 400, and the joint of the pure water pipeline 200 and the washing pipeline 400 is provided with a high-pressure pump 210. One end of the waste water pipeline 300 is connected with waste water outlet of the RO filtering membrane 120, and the other end is a discharge end connected to, for example, drainage ditch or other waste water discharge or recycle equipment. The second branch line 520 is connected between the waste water pipeline 300 and the washing pipeline 400. If the first branch line 510 is provided, the first branch line 510 and the second branch line 520 are connected in parallel connection between the waste water pipeline 300 and the washing pipeline 400, respectively. With the above structural design, the car washing system according to the present invention uses a booster pump 140 to pressurize the raw water to produce high pressure raw water, and the high-pressure raw water may be transported through the optional first branch line 510 of the waste water pipeline 300 to the washing pipeline 400 for washing, which allows the pressurized washing by raw water and improves the preliminary washing effect. At this time, the water inlet side of the RO filter membrane 120 has a certain pressure, and the pure water outlet generates pure water filling the pure water pipeline 200. When switched to pure water washing, the pure water side can directly discharge water without the need for waiting for water usage, which improves user experience. In addition, after the car washing system completes the car washing, by opening the second branch line 520, high-pressure water in the washing pipeline 400 and the pure water pipeline 200 flows to the waste water pipeline 300 through the second branch line 520, and discharges out of the device. Accordingly, the present invention can achieve pressure relief in the system after car washing is completed, and the water in each pipeline is discharged after the pressure relief, allowing easier storage. This solves the problem of residual water in the water pipes after car washing, where residual water in the long-term damages the car washing device.

It should be noted that in various possible implementations in accordance with the idea of the present invention, the car washing system may also not comprise the filter cartridge 110. Here, one end of the filtering pipeline 130 is connected to the inlet of the RO filter membrane 120, and the other end of the filter pipeline 130 can be connected to the raw water pipeline 600 or directly connected to raw water source, which is not limited by this embodiment.

Optionally, the filter cartridge 110 is a PPCTO composite filter cartridge 110.

Specifically, low pressure inlet of the booster pump 140 leads to outlet of the filter cartridge 110, and high pressure outlet of the booster pump 140 leads to inlet of the RO filter membrane 120.

Specifically, in this embodiment, inlet of the high-pressure pump 210 leads to the pure water pipeline 200, outlet of the high-pressure pump 210 leads to the washing pipeline 400.

Optionally, as shown in FIGS. 1 and 2, in this embodiment, the pure water pipeline 200 is provided with a first control valve 220. A section of the waste water pipeline 300 between the first branch line 510 (if provided) and second branch line 520 is provided with a second control valve 310. The first branch line 510 (if provided) is provided with a first one-way valve 511, and the conducting direction of the first one-way valve 511 is a direction from the waste water pipeline 300 to the washing pipeline 400; the second branch line 520 is provided with a third control valve 521. A section of the filtering pipeline 130 between the filter cartridge 110 and booster pump 140 is provided with a fourth control valve 131. In other embodiments, the fourth control valve 131 can also be set on the inlet side of the filter cartridge 110, for example, be set at the raw water pipeline 600, which is not limited to this embodiment.

Specifically, in this embodiment, the third control valve 521 may be a solenoid valve, and the working mode of the third control valve is to be normally closed with power and normally open without power. In other words, when the third control valve 521 is a solenoid valve, a normally closed solenoid valve can be specifically selected, taking advantage of the working characteristics of such solenoid valve to achieve the functions of the valve described above, which simplifies the control system and control logic.

Furthermore, as shown in FIGS. 1 and 2, in this embodiment, the pure water pipeline 200 can be provided with a second one-way valve 230, where the conducting direction of the second one-way valve 230 is a direction from the RO filter membrane 120 to the washing pipeline 400.

Furthermore, as shown in FIGS. 1 and 2, in this embodiment, the connecting position of the waste water pipeline 300 and the first branch line 510 (if provided) is closer to the RO filter membrane 120 than the connecting position of the waste water pipeline 300 and the second branch line 520. On this basis, the section of the waste water pipeline 300 between the first branch line 510 and the RO filter membrane 120 is provided with an integrated waste water ratio and washing valve 320. The integrated waste water ratio and washing valve 320 has two flow positions, the relation of which is equivalent to parallel relation, which are waste water ratio position and electromagnetic valve position, respectively. When connected at the electromagnetic valve position, water flow of the integrated waste water ratio and washing valve 320 is completely open; when connected at the waste water ratio position, water outlet of the integrated waste water ratio and washing valve 320 is smaller than the water outlet when connected at the electromagnetic valve position.

Furthermore, as shown in FIGS. 1 and 2, in this embodiment, a section of the washing pipeline 400 between the high-pressure pump 210 and the first branch line 510 (if provided) is provided with a first pressure switch 420, and the first pressure switch 420 can collect the pressure information of the washing pipeline 400. In addition, the wash system according to the present invention may further comprise a control unit, where the control unit is respectively connected to the booster pump 140, the high-pressure pump 210, the first control valve 220, the second control valve 310, the third control valve 521, the fourth control valve 131 and the integrated waste water ratio and washing valve 320. Here, the control unit is configured to control the booster pump 140, the high-pressure pump 210 and other valve components according to the pressure information of the washing pipeline 400. Optionally, as shown in FIG. 1, in this embodiment, the wash system according to the present invention may further comprise a raw water pipeline 600. One end of the raw water pipeline 600 is connected to raw water inlet of the filter cartridge 110, and the other end is used to connect raw water source. The raw water pipeline 600 is provided with a second pressure switch 610, where the second pressure switch 610 collects pressure information of the raw water pipeline 600. Here, the control unit is configured to control the booster pump 140, the high-pressure pump 210 and various valve units according to the pressure information of the raw water pipeline 600.

Optionally, as shown in FIGS. 1 and 2, in this embodiment, the pure water pipeline 200 is provided with conductivity meter 240, and the conductivity meter 240 is connected to the control unit, and measures the conductivity of pure water in the pure water pipeline 200. In this way, the control unit according to the invention can determine the lifetime of the filter cartridge 110 according to the conductivity measured by the conductivity meter 240. During pure water car washing, when the conductivity measured by the conductivity meter 240 in the pure water pipeline 200 is higher than a threshold value, the control unit may issue an alarm based on this, alerting that the water quality is inferior and the filter cartridge 110 needs to be changed.

Optionally, in this embodiment, the pure water pipeline 200 may be provided with a flowmeter, where the flowmeter measures the flow of the pure water pipeline 200.

Optionally, as shown in FIGS. 1 and 2, in this embodiment, the raw water pipeline 600 may be provided with a conductivity meter 620, where the conductivity meter 620 can measure the conductivity of the raw water in the pure water pipeline 200.

Optionally, as shown in FIGS. 1 and 2, in this embodiment, the other end of the washing pipeline 400 is connected to a spray gun 410. Based on the above detailed description of the exemplary embodiment of the car washing system according to the present invention, the working principles of several operation modes of the car washing system are described below.

Raw water car washing: after the raw water flows through the filter cartridge 110, it enters the fourth control valve 131, and then enters the RO filter membrane 120 after pressurized by the booster pump 140. By the integrated waste water ratio and washing valve 320 (having two conducting positions, one being the waste water ratio position, where when connected at this position, water outlet of the integrated waste water ratio and washing valve 320 is relatively small; another being the electromagnetic valve position, where when connected at this position, the water line is completely open; the waste water ratio position and the electromagnetic valve position are equivalent to being parallel) connected in the waste water pipeline 300, the raw water enters the first branch line 510 at this time, and then enters the washing pipeline 400 through the first one-way valve 511. The spray gun 410 sprays high pressure raw water, allowing raw water washing. At this time, the first control valve 220 of the pure water pipeline 200 is closed, no water flows out of the pure water outlet of the RO filter membrane 120, and the high-pressure pump 210 is not activated. The second control valve 310 of wastewater line 300 is closed, and the third control valve 521 of the second branch 520 is closed. Accordingly, during raw water car washing, the present invention allows washing of the surface of the RO filter membrane 120, which reduces contamination and prolongs the service life of the RO filter membrane 120.

Pure water car washing: raw water flows through the filter cartridge 110, into the fourth control valve 131, pressurized by the booster pump 140, and then into the RO filter membrane 120. The first control valve 220 of the water pipeline 200 is opened, and pure water flows through the first control valve 220 into the high-pressure pump 210 for pressurizing, and enters the washing pipeline 400. The spray gun 410 sprays high pressure pure water, allowing pure water car washing. Meanwhile, waste water flows through the integrated waste water ratio and washing valve 320 (electromagnetic valve position is off, waste water ratio position is on) of the waste water pipeline 300, enters the second control valve 310 and discharges out of the system. At this time, the second control valve 310 of the waste water pipeline 300 is open, the third control valve 521 (because power to the third control valve 521 is on after startup of the wash system, a normally closed solenoid valve can be selected as the third control valve 521) of the second branch 520 is closed.

Washing process controlling: during the washing process, the control unit can control the start and stop of the car washing system by the first pressure switch 420 of the washing pipeline 400 and the pure water pipeline 200. For example, when the spray gun 410 is turned off, the first pressure switch 420 detects that the pressure in the washing pipeline 400 reaches a certain threshold, and accordingly, the control unit may control the booster pump 140 and the high-pressure pump 210 to turn off. In another example, when the spray gun 410 is turned on, the first pressure switch 420 detects that the pressure in the washing pipeline 400 decreases to a certain threshold, and accordingly, the control unit may control the booster pump 140 and the high-pressure pump 210 to turn on and produce high-pressure water for car washing. Accordingly, the present invention can realize the automatic control of an integrated raw water preliminary washing and pure water washing.

After the washing completed: after the car washing is completed, when the power supply of the car washing system is disconnected, the third control valve 521 of the second branch line 520 is open (when the third control valve 521 is a normally closed solenoid valve, it is switched to open state when power is disconnected), high-pressure water in the washing pipeline 400 and pure water pipeline 200 flows through the second branch line 520 into the waste water pipeline 300 and discharges out of the system. High-pressure water in the inlet pipe of the RO filter membrane 120 after the fourth control valve 131, the membrane and the wastewater pipeline 300, flows through the integrated waste water ratio and washing valve 320, the first one-way valve 511 of the first branch line 510 (if the optional first branch line 510 is provided), the third control valve 521 of the second branch line 520, into the waste water pipeline 300 and discharge out of the system. At this time, the fourth control valve 131, the first control valve 220, the integrated waste water ratio and washing valve 320 are in closed state. If the optional first branch line 510 is not provided, the high-pressure water in the inlet pipe of the RO filter membrane 120 after the fourth control valve 131, the membrane and the wastewater pipeline 300, may be discharged through the waste water pipeline 300 by opening the second control valve 310. Accordingly, the present invention enables the pressure relief of the whole pipeline after power is turned off, which protects the components of the car washing system, and facilitate easy storage of the pipeline.

During operation, when the second pressure switch 610 of the raw water pipeline 600 detects that the raw water pressure is lower than a certain threshold, accordingly, the control unit may close the fourth control valve 131, booster pump 140, high pressure pump 210, the first control valve 220, the second control valve 310, so that the car washing system is in shutdown state. When the raw water pressure is higher than a certain threshold, the whole system of the car washing system restores the current setting mode, such as raw water car washing mode, pure water car washing mode or standby mode.

It should be noted here that the car washing systems shown in the drawings and described in this specification are only examples among a number of car washing systems employing the principles of the present invention. It should be clearly understood that the principle of the present invention is by no means limited to any detail or components of the car washing system shown in the drawings or described in this application.

To sum up, the car washing system according to the invention uses a booster pump to pressurize the raw water to produce high pressure raw water, and the high-pressure raw water may be transported through the optional first branch line of the waste water pipeline to the washing pipeline for washing, which can achieve the pressurized raw water washing and improve the preliminary washing effect. At this time, the water inlet side of the RO filter membrane has a certain pressure, and the pure water outlet generates pure water to fill the pure water pipeline. When switched to the pure water washing, the pure water side can directly discharge water without causing the wait for water usage, which improves user experience. In addition, after the car washing system completes the car washing, by opening the second branch line, high-pressure water in the washing pipeline and the pure water pipeline flows to the waste water pipeline through the second branch line, and discharges out of the device. Accordingly, the present invention can achieve pressure relief after car washing is completed, and the water in each pipeline is discharged after the pressure relief, allowing easy storage. This solves the problem of residual water in the water pipes after car washing, where residual water in the long-term damages the car washing device.

FIG. 3 shows a car washing system according to another exemplary embodiment, which has the same components and structure as the embodiment shown in FIGS. 1 and 2, except that the first branch line 510 is connected to the pure water pipeline 200 at a position upstream to the inlet of the high-pressure pump 210. In the embodiment shown in FIGS. 1 and 2, during raw water washing, the booster pump 140 is activated to provide the pressure for raw water washing. In contrast, in the embodiment shown in FIG. 3, during raw water washing, the high-pressure pump 210 is activated to provide pressure while the booster pump 140 is not activated. The booster pump 140 provides a relatively low washing pressure (e.g., operating at a pressure of about 0.8 MPa), while the high-pressure pump 210 provides a relatively high washing pressure and better washing effects. During pure water washing, the booster pump 140 is activated to generate pure water, which is used for car washing after being pressurized by the high-pressure pump 210. As compared to the embodiment shown in FIGS. 1 and 2, the embodiment shown in FIG. 3 solves the issue of low pressure for raw water washing, which improves user experience.

Exemplary embodiments of the car washing system according to the present invention are described and/or illustrated in detail above. However, embodiments of the present invention are not limited to the specific embodiments described herein, but rather, components and/or steps of each embodiment may be used independently and separately from other components and/or steps described herein. Each component and/or each step of one embodiment may also be used in combination with other components and/or steps of other embodiments. When introducing elements/components/etc. described and/or illustrated herein, the terms "a," "one," "said," etc. are used to indicate that there are one or more of the elements/components/etc. The terms "comprising," "including" and "having" are used to indicate an open-ended inclusive group, and mean that there may be additional elements/components/etc. in addition to the listed elements/components/etc. In addition, the terms "first" and "second", etc. in the claims and the description are used only as labels, not as numerical limitations on their subjects.

While the proposed car washing system according to the present invention has been described in terms of various specific embodiments, those skilled in the art will recognize that changes may be made to the implementation of the present invention within the spirit and scope of the claims.

The invention claimed is:
1. A car washing system, wherein:
said car washing system comprises a filtering unit, a pure water pipeline, a waste water pipeline, a washing pipeline, and a second branch line;
said filtering unit comprises an RO filter membrane, a filtering pipeline and a booster pump, one end of said filtering pipeline is connected to the inlet of the RO filter membrane, said booster pump is set in the filtering pipeline;
said pure water pipeline is connected between a pure water outlet of the RO filter membrane and one end of the washing pipeline, and the joint of the pure water pipeline and the washing pipeline is provided with a high-pressure pump;
one end of said waste water pipeline is connected with waste water outlet of the RO filtering membrane, and the other end thereof is a discharge end;
the second branch line is connected between the waste water pipeline and the washing pipeline.
2. The car washing system according to claim 1, further comprising a first branch line,
wherein the first branch line and the second branch line are connected in parallel between the waste water pipeline and the washing pipeline, respectively.
3. The car washing system according to claim 1, further comprising a first branch line connected between the waste water pipeline and the pure water pipeline,
wherein the first branch line is connected to the pure water pipeline at a position upstream to the inlet of the high-pressure pump.
4. A car washing system according to claim 1, wherein the car washing system further comprises a filter cartridge, and the other end thereof of the filtering pipeline is connected to an outlet of the filter cartridge.
5. A car washing system according to claim 4, wherein the filter cartridge is a PPCTO composite filter cartridge.
6. A car washing system according to claim 4, wherein a low-pressure inlet of the booster pump leads to an outlet of the filter cartridge, and a high-pressure outlet of the booster pump leads to an inlet of the RO filter membrane.
7. A car washing system according to claim 1, wherein an inlet of the high-pressure pump leads to the pure water pipeline, and an outlet of the high-pressure pump leads to the washing pipeline.
8. A car washing system according to claim 2, wherein the pure water pipeline is provided with a first control valve, and a section of the waste water pipeline between the first branch line and second branch line is provided with a second control valve, and the first branch line is provided with a first one-way valve, and the conducting direction of the first one-way valve is a direction from the waste water pipeline to the washing pipeline, and the second branch line is provided with a third control valve, and the filtering pipeline is provided with a fourth control valve.
9. A car washing system according to claim 8, wherein the third control valve is a solenoid valve, and the working mode of the third control valve is normally closed with power and normally open without power.

10. A car washing system according to claim 8, wherein the pure water pipeline is provided with a second one-way valve, and the conducting direction of the second one-way valve is a direction from the RO filter membrane to the washing pipeline.

11. A car washing system according to claim 8, wherein the connecting position of the waste water pipeline and the first branch line is closer to the RO filter membrane than the connecting position of the waste water pipeline and the second branch line; wherein the section of the waste water pipeline between the first branch line and the RO filter membrane is provided with an integrated waste water ratio and washing valve, the integrated waste water ratio and washing valve comprises two conducting positions, the relation of which is equivalent to parallel relation, which are waste water ratio position and the electromagnetic valve position, respectively, when connected at the electromagnetic valve position, water flow of the integrated waste water ratio and washing valve is completely open; when connected at the waste water ratio position, water outlet of the integrated waste water ratio and washing valve is smaller than the water outlet when connected at the electromagnetic valve position.

12. A car washing system according to claim 11, wherein a section of the washing pipeline between the high-pressure pump and the first branch line is provided with a first pressure switch for collecting the pressure information of the washing pipeline; wherein the wash system further comprises:
   a control unit, respectively connected to the booster pump, the high-pressure pump, the first control valve, the second control valve, the third control valve, the fourth control valve and the integrated waste water ratio and washing valve;
   wherein the control unit is configured to control the booster pump, the high-pressure pump and the various valves according to the pressure information of the washing pipeline.

13. A car washing system according to claim 12, wherein the car washing system further comprises:
   a raw water pipeline, one end of the raw water pipeline is connected to a raw water inlet of the filter cartridge, the other end thereof is used to connect a raw water source, and the raw water pipeline is provided with a second pressure switch for collecting pressure information of the raw water pipeline;
   wherein the control unit is configured to control the booster pump, the high-pressure pump and the various valves according to the pressure information of the raw water pipeline.

14. A car washing system according to claim 1, wherein the pure water pipeline is provided with a conductivity meter, and the conductivity meter is connected to a control unit; where the conductivity meter is configured for collecting conductivity of pure water in the pure water pipeline and sending it to the control unit, wherein the control unit is configured to issue an alarm when the conductivity is higher than a threshold value.

15. A car washing system according to claim 1, wherein the other end of the washing pipeline is connected to a spray gun; and/or, the pure water pipeline is provided with a flowmeter; and/or, the wash system further comprises a raw water pipeline, one end of the raw water pipeline is connected to a raw water inlet of the filter cartridge, the other end thereof is used to connect a raw water source, and the raw water pipeline is provided with a conductivity meter.

* * * * *